United States Patent
Yang et al.

(10) Patent No.: US 8,300,929 B2
(45) Date of Patent: Oct. 30, 2012

(54) AUTOMATIC RED-EYE OBJECT CLASSIFICATION IN DIGITAL PHOTOGRAPHIC IMAGES

(75) Inventors: Susan Yang, Toronto (CA); Rastislav Lukac, San Jose, CA (US)

(73) Assignee: Seiko Epson Corporation, Tokyo (JP)

(*) Notice: Subject to any disclaimer, the term of this patent is extended or adjusted under 35 U.S.C. 154(b) by 570 days.

(21) Appl. No.: 12/575,321

(22) Filed: Oct. 7, 2009

(65) Prior Publication Data

US 2011/0080616 A1 Apr. 7, 2011

(51) Int. Cl.
*G06K 9/00* (2006.01)
*G06K 9/46* (2006.01)
*G06K 9/66* (2006.01)
*G06K 9/62* (2006.01)

(52) U.S. Cl. ........ 382/165; 382/162; 382/192; 382/224; 382/225

(58) Field of Classification Search .......... 382/162, 382/165, 192, 224, 225
See application file for complete search history.

(56) References Cited

U.S. PATENT DOCUMENTS

| | | |
|---|---|---|
| 7,116,820 B2 | 10/2006 | Luo et al. |
| 7,333,653 B2 | 2/2008 | Luo et al. |
| 7,336,821 B2 | 2/2008 | Ciuc et al. |
| 7,403,654 B2 | 7/2008 | Wu et al. |
| 7,415,165 B2 | 8/2008 | Itagaki et al. |
| 7,454,040 B2 | 11/2008 | Luo et al. |
| 2002/0126893 A1* | 9/2002 | Held et al. ............ 382/167 |
| 2002/0176623 A1 | 11/2002 | Steinberg |
| 2004/0213476 A1 | 10/2004 | Luo et al. |
| 2004/0240747 A1 | 12/2004 | Jarman et al. |
| 2005/0047655 A1 | 3/2005 | Luo et al. |
| 2005/0047656 A1 | 3/2005 | Luo et al. |
| 2005/0063582 A1* | 3/2005 | Park et al. ............ 382/154 |
| 2005/0117173 A1* | 6/2005 | Kugo ................ 358/1.1 |
| 2005/0140801 A1 | 6/2005 | Prilutsky et al. |
| 2006/0017825 A1 | 1/2006 | Thakur |
| 2006/0257026 A1 | 11/2006 | Shiffer et al. |
| 2006/0280363 A1 | 12/2006 | Umeda |
| 2008/0112613 A1 | 5/2008 | Luo et al. |
| 2008/0137944 A1 | 6/2008 | Marchesotti et al. |
| 2008/0170778 A1 | 7/2008 | Luo |

(Continued)

FOREIGN PATENT DOCUMENTS

EP 1510973 A2 3/2005
(Continued)

OTHER PUBLICATIONS

An Efficient Automatic Redeye Detection and Correction Algorithm, Huitao Luo, Jonathan Yen and Dan Tretter, Hewlett-Packard Labs, 1501 Page Mill Road, MS 1203, Palo Alto CA, 94304, Aug. 23-26, 2004, vol. 2, (pp. 1-4).

(Continued)

*Primary Examiner* — Bernard Krasnic

(57) ABSTRACT

Automatic red-eye object classification in digital photographic images. A method for classifying a candidate red-eye object in a digital photographic image includes several acts. First, a candidate red-eye object in a digital photographic image is selected. Next, RGB pixels of the candidate red-eye object are converted into YUV pixels. Then, the YUV pixels satisfying a constraint that is a function of the YUV pixels are summed. Next, the sum is determined to be greater than or equal to a scaled version of the total number of YUV pixels in the candidate red-eye object. Finally, the candidate red-eye object is transformed into a true red-eye object.

6 Claims, 9 Drawing Sheets

U.S. PATENT DOCUMENTS

2008/0219518 A1     9/2008    Steinberg et al.
2008/0232711 A1     9/2008    Prilutsky et al.

FOREIGN PATENT DOCUMENTS

JP            63-146173      6/1988
WO       2005/022466 A2     3/2005

OTHER PUBLICATIONS

Automated Red-Eye Detection and Correction in Digital Photographs, Lei Zhang, Yanfeng Sun, Mingjing Li, Hongjiang Zhang, Microsoft Research Asia, 49 Zhichun Road, Beijing 100080, China, IEEE, Oct. 24-27, 2004, (pp. 2363-2366).

Automated Red-Eye Detection and Correction, Matthew Gaubatz, Cornell University, and Robert Ulichney, Hewlett-Packard Co., Sep. 22-25, 2002, vol. 1, (pp. I-804-I-807).

Digital Photography with Flash and No-Flash Image Pairs, Georg Petschnigg, Maneesh Agrawala, Hugues Hoppe, Richard Szeliski, Michael Cohen, Kentaro Toyama, Microsoft Corporation, Aug. 2004, vol. 23, Issue 3, (pp. 664-672).

Probabilistic Automatic Red Eye Detection and Correction, Jutta Willamowski and Gabriela Csurka, Xerox Research Centre Europe, 6, ch. de Maupertuis, 38240 Meylan, France, 18th International Conference, vol. 3, Jan. 2006, (pp. 762-765).

Red Eye Detection with Machine Learning, Sergey Ioffe, Fujifilm Software (California), 1740 Technology Dr., Suite 490, San Jose, CA 95110, Image Processing, 2003, ICIP 2003. Proceedings 2003 International Conference, Sep. 14-17, 2003, (pp. 871-874).

Red Eye Removal Using Digital Color Image Processing, Jon Y. Hardeberg, Conexant Systems, Inc., Redmond, Washington, Apr. 2001, (pp. 1-6).

\* cited by examiner

AUTOMATIC RED-EYE OBJECT CLASSIFICATION IN DIGITAL PHOTOGRAPHIC IMAGES

THE FIELD OF THE INVENTION

Embodiments of present invention relate to digital image processing and pattern recognition. More specifically, example embodiments of the present invention relate to methods for automatic red-eye object classification in digital photographic images.

BACKGROUND

Red-eye detection and correction technologies are used in printers, digital cameras, photo viewers, image editing software and related imaging devices and applications to localize and correct the red-eye effects in digital photographic images that are often captured when using a flash. Though there has been a great deal of progress in red-eye detection and correction in the last few years, many problems remain unsolved. For example, red-eye detection and correction must deal with varying illumination, low image quality and resolution, eye size and face orientation variations, and background changes in complex real-life scenes.

Typically, early stages of a red-eye detection pipeline have to distinguish between true red-eye objects and a number of incorrectly detected non-red-eye objects, also known as false red-eye objects. False red-eye objects are particularly prevalent in complex visual scenes. False red-eye objects can be reduced based on the evaluation of the objects' color, structural and geometric characteristics. Unfortunately, many real-world patterns exhibit similar color and structural characteristics as true red-eye objects, thus resulting in a high number of false red-eye objects even at higher stages of the detection pipeline.

SUMMARY

In general, example embodiments relate to methods for automatic red-eye object classification in digital photographic images. Some example embodiments employ various object and image characteristics such as luminance, chrominance, contrast, smoothness, binary patterns, and feature spatial distributions to target different types of false red-eye objects, thus resulting in improved performance and efficiency of the detection pipeline.

In a first example embodiment, a method for classifying a candidate red-eye object in a digital photographic image includes several acts. First, a candidate red-eye object in a digital photographic image is selected. Next, RGB pixels of the candidate red-eye object are converted into YUV pixels. Then, the YUV pixels satisfying a constraint that is a function of the YUV pixels are summed. Next, the sum is determined to be greater than or equal to a scaled version of the total number of pixels in the candidate red-eye object. Finally, the candidate red-eye object is transformed into a true red-eye object.

In a second example embodiment, another method for classifying a candidate red-eye object in a digital photographic image includes several acts. First, a candidate red-eye object in a digital photographic image is selected. Next, standard deviation values of pixels of the candidate red-eye object for a particular feature signal are calculated. Then, the pixels satisfying a constraint that is a function of the standard deviation are summed. Next, the sum is determined to be less than or equal to a tunable minimum number of signals. Finally, the candidate red-eye object is transformed into a true red-eye object.

In a third example embodiment, yet another method for classifying a candidate red-eye object in a digital photographic image includes several acts. First, an area of a candidate red-eye object is mirrored in order to create a set of blocks neighboring with the candidate red-eye object. Each block has dimensions identical with dimensions of the area of the candidate red-eye object. Next, a set of binarization thresholds is adaptively obtained. Then, the candidate red-eye object and its mirror regions are binarized using one of the thresholds. Next, a ratio is calculated between the number of white pixels and the number of black pixels for each of the blocks. Then, the block ratios are compared with predetermined values in order to determine that an eye binary pattern constraint is satisfied. Finally, the candidate red-eye object is transformed into a true red-eye object.

In a fourth example embodiment, yet another method for classifying a candidate red-eye object in a digital photographic image includes several acts. First, a candidate red-eye object in a digital photographic image is selected. Next, an area of the candidate red-eye object is redefined by placing a new area in the center of the candidate red-eye object or in any other point within a bounding box of the candidate red-eye object. Then, pixels satisfying a feature constraint are labeled in order to determine the number of disjoint objects and the object with maximum dimensions created from pixels satisfying the feature constraint. Next, the number of disjoint objects and the maximum object dimensions are determined to be greater than predetermined values. Finally, the candidate red-eye object is transformed into a true red-eye object.

In a fifth example embodiment, another method for classifying a candidate red-eye object in a digital photographic image includes several acts. First, a candidate red-eye object in a digital photographic image is selected. Next, RGB data of the digital photographic image is converted into a color-ratio-like redness. Then, pixels of the candidate that satisfy a redness constraint are summed. Next, the sum is determined to be less than a threshold. Finally, the candidate red-eye object is transformed into a true red-eye object.

In sixth, seventh, eighth, ninth, and tenth example embodiments, one or more computer-readable media have computer-readable instructions thereon which, when executed by a processor, implement the methods discussed above in connection with the first, second, third, fourth, and fifth example embodiments, respectively.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF SOME EXAMPLE EMBODIMENTS

Figure 1:
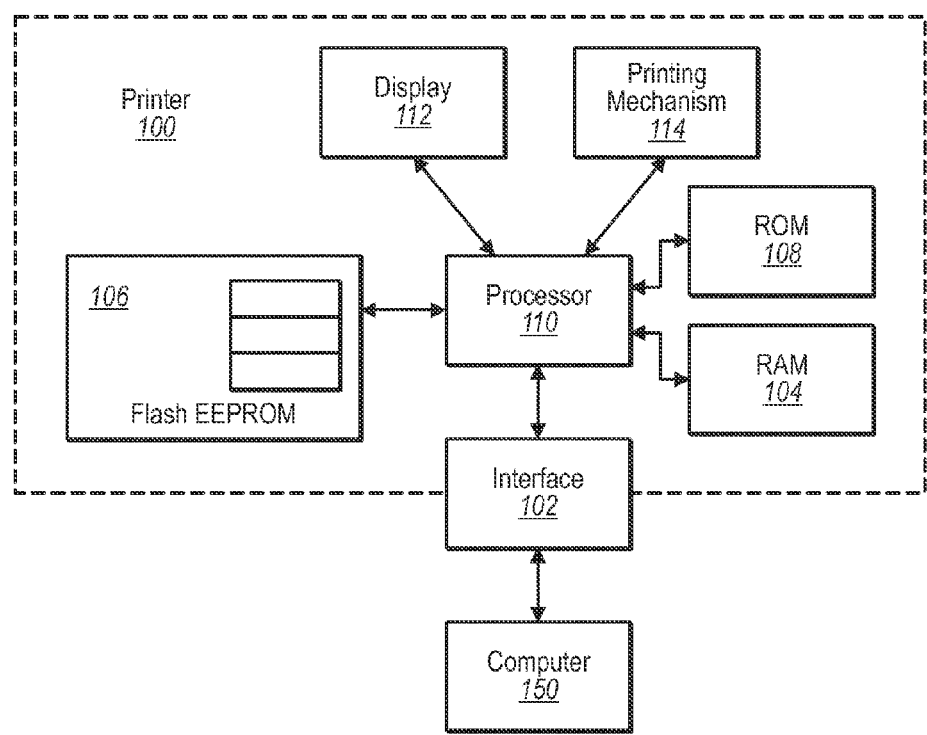
FIG. 1 is a schematic representation of an example printer.

In the following detailed description of the embodiments, reference is made to the accompanying drawings that show, by way of illustration, specific embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to systems and methods for automatic red-eye object classification in digital photographic images. Example embodiments can be used to automatically identify and remove false red-eye objects from a list of candidate red-eye objects.

I. Example Environment

The example methods and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing apparatuses such as digital cameras (an example of which includes, but is not limited to, the Epson R-D1 digital camera manufactured by Seiko Epson Corporation headquartered in Owa, Suwa, Nagano, Japan), digital document cameras (an example of which includes, but is not limited to, the Epson DC-10s document camera manufactured by Seiko Epson Corporation) digital camcorders, projectors, printers (examples of which include, but are not limited to, the Epson Artisan® 50 Ink Jet Printer, Epson WorkForce 30 and 40 Ink Jet Printers, the Epson Stylus C88+, Photo R280, Photo 1400, Photo R1900, and Photo R2880 Ink Jet Printers, and Epson B-300 and B-500DN Color Business Ink Jet Printers, all manufactured by Seiko Epson Corporation), scanners (examples of which include, but are not limited to, the Epson Perfection© V30, V200, V300, V500, V700, 4490, V750-M Pro, and 4490, the Epson Expression© 10000XL, and the Epson GT-S80, GT-1500, GT-2500, GT-15000, GT-20000, and GT-30000, all manufactured by Seiko Epson Corporation), copiers, portable photo viewers (examples of which include, but are not limited to, the Epson P-3000, P-5000, P-6000, and P-7000 portable photo viewers manufactured by Seiko Epson Corporation), or portable movie players, or some combination thereof, such as printer/scanner/copier combinations or "All-in-Ones" (examples of which include, but are not limited to, the Epson Stylus Photo RX580, RX595, or RX680, the Epson Stylus CX4400, CX7400, CX8400, or CX9400Fax, the Epson AcuLaser® CX11NF, and the Epson Artisan® 500, 600, 700, and 800, all manufactured by Seiko Epson Corporation) or a digital camera/camcorder combinations.

An image processing apparatus may include automatic red-eye detection and correction capability, which includes automatic red-eye object classification capabilities, for example, to automatically detect and correct red-eye objects in a digital photographic image. For example, a printer with this automatic red-eye detection and correction capability may include one or more computer-readable media that implement the example methods disclosed herein, or a computer connected to the printer may include one or more computer-readable media that implement the example methods disclosed herein.

While any imaging apparatus could be used, for purposes of illustration an example embodiment will be described in connection with an example printer, a schematic representation of which is denoted at 100 in FIG. 1. Example embodiments of the printer 100 include, but are not limited to, the printer models or printer/scanner/copier "All-in-One" models disclosed herein.

The example printer 100 exchanges data with a host computer 150 by way of an intervening interface 102. Application programs and a printer driver may also be stored for access on the host computer 150 or on the printer 100. When an image retrieve command is received from the application program, for example, the printer driver controls conversion of the command data to a format suitable for the printer 100 and sends the converted command data to the printer 100. The driver also receives and interprets various signals and data from the printer 100, and provides necessary information to the user by way of the host computer 150.

When data is sent by the host computer 150, the interface 102 receives the data and stores it in a receive buffer forming part of a RAM 104. The RAM 104 can be divided into a number of sections, through addressing for example, and allocated as different buffers, such as a receive buffer or a send buffer. For example, digital photographic image data can be sent to the printer 100 from the host computer 150. Digital photographic image data can also be obtained by the printer 100 from the flash EEPROM 106 or the ROM 108. For example, a portable flash EEPROM card can be inserted into the printer 100. This digital photographic image data can then be stored in the receive buffer or the send buffer of the RAM 104.

A processor 110 uses computer-executable instructions stored on the ROM 108 or on the flash EEPROM 106, for example, to perform a certain function or group of functions, such as the example methods for automatic red-eye detection and correction, or for automatic red-eye object classification disclosed herein. Where the data in the receive buffer of the RAM 104 is a digital photographic image, for example, the processor 110 can implement the methodological acts on the digital photographic image of the example methods for automatic red-eye detection and correction disclosed herein to automatically detect and then correct red-eye objects in the digital photographic image. The corrected digital photographic image can then be sent to a display 112 for a preview display thereon, to the printing mechanism(s) 114 for printing thereon, or to the host computer 150 for storage or display thereon, for example. The processor 110 is in electronic communication with the display 112, which can be any type of an electronic display including, but not limited to a visual display such as a liquid crystal display (LCD). The processor 110 is also in electronic communication with the printing mechanism(s) 114, which can be any type of printing mechanism(s) including, but not limited to, ink-jet, laser, LED/LCD, impact, solid ink, and dye sublimation printing mechanism(s).

II. Example Method for Automatic Red-Eye Detection and Correction

Figure 2:
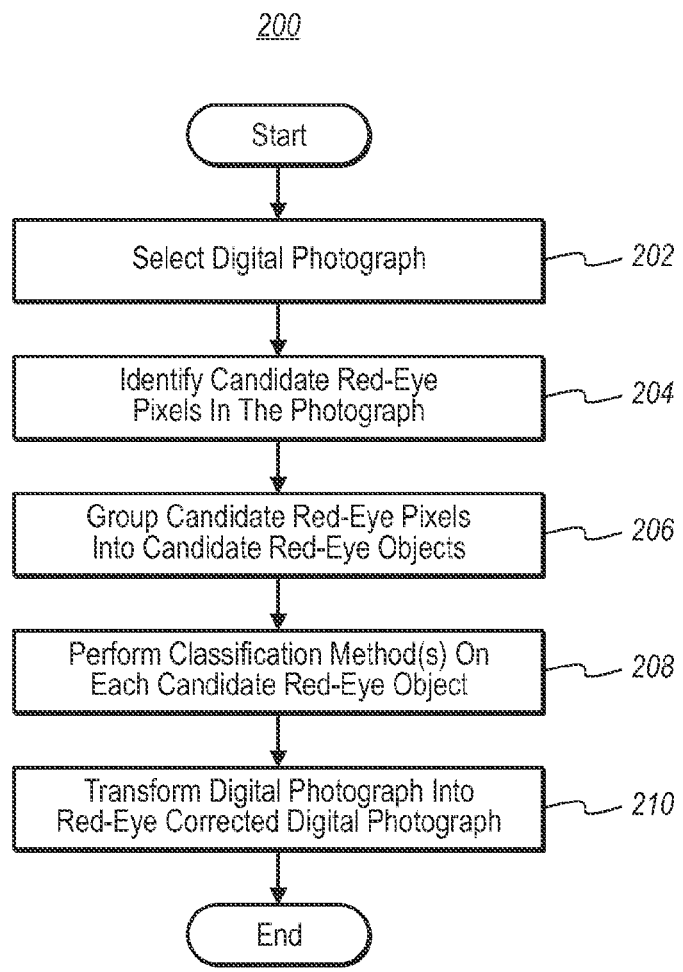
FIG. 2 is a flowchart of an example method for automatic red-eye detection and correction.

FIG. 2 is a flowchart of an example method 200 for automatic red-eye detection and correction. The example method 200 detects and corrects red-eye objects in a digital photographic image. Accordingly, the example method 200 results in the transformation of a digital photographic image with one or more red-eye objects into a corrected digital photographic image with fewer or no red-eye objects. The various acts of the method 200 will now be discussed in turn.

First, at 202, a digital photographic image is selected for red-eye detection and correction. For example, a digital color photograph or a digitized version of a traditional color photograph can be selected for red-eye detection and correction. The digital photographic image may constitute a red-green-blue (RGB) color image x with $K_1 \times K_2$ pixels $x_{(r,s)} = [x_{(r,s)1}, x_{(r,s)2}, x_{(r,s)3}]$ where $x_{(r,s)1}$, $x_{(r,s)2}$, and $x_{(r,s)3}$ denote the R, G, and B component, respectively. The term (r,s) denotes the pixel location with $r=1, 2, \ldots, K_1$ and $s=1, 2, \ldots, K_2$ indicating the image row and column, respectively.

Next, at 204, candidate red-eye pixels are identified in the digital photographic image. For example, this identification of candidate red-eye pixels can be accomplished by transforming the image x into a binary map d with a resolution of $K_1 \times K_2$ pixels $d_{(r,s)}$ where the value $d_{(r,s)}=1$ indicates that $x_{(r,s)}$ is a candidate red-eye pixel and $d_{(r,s)}=0$ denotes that $x_{(r,s)}$ is not a candidate red-eye pixel. The candidate red-eye pixels can be localized using any known method of red-eye detection.

Then, at 206, candidate red-eye pixels are grouped into candidate red-eye objects. For example, this grouping can be accomplished by performing a procedure whereby the map d undergoes object segmentation which groups adjacent pixels with $d_{(r,s)}=1$. This procedure partitions the map d into N disjoint candidate red-eye objects $O_i = \{(r,s) \in \Phi_i; d_{(r,s)}^i = 1\}$, for $i=1, 2, \ldots, N$. Each candidate red-eye object $O_i$ is characterized by $\Phi_i$, which is the set of pixel locations (r,s) where $d_{(r,s)}^i = 1$ which are bounded by a $\Phi_i^y \times \Phi_i^x$ bounding box with height $\Phi_i^y$ and width $\Phi_i^x$. Thus, the object $O_i$ can be seen as an image of dimensions $\Phi_i^y \times \Phi_i^x$ and can be handled separately from all other objects in $\{O_i; i=1, 2, \ldots, N\}$.

Next, at 208, one or more classification methods is performed on each candidate red-eye object in order to eliminate candidate red-eye objects that are false red-eye objects and confirm the remaining red-eye objects as true red-eye objects, and potentially refine the true red-eye objects. For example, one or more of the classification methods 400, 500, 600, 800, and 900 disclosed herein can be performed on each of the N disjoint candidate red-eye objects $O_i = \{(r,s) \in \Phi_i; d_{(r,s)}^i = 1\}$. The performance of the methods 400, 500, 600, 800, and 900 results in the elimination of false red-eye objects.

Finally, at 210, the original digital photographic image is transformed into a red-eye corrected digital photographic image by removing the red-eye effect from each confirmed true red-eye object. The red-eye effect can be removed using any known method of red-eye correction.

It is noted that the example method 200 for automatic red-eye detection and correction transforms electronic data that represents a physical and tangible object. In particular, the example method 200 transforms an electronic data representation of a photographic image that represents a real-world visual scene, such as a photograph of a person or a landscape, for example. During the example method 200, the data is transformed from a first state into a second state. In the first state, the data represents the real-world visual scene with red-eye objects present in the scene. In the second state, the data represents the real-world visual scene with the red-eye object removed from the scene.

Several example methods for classifying red-eye objects will now be disclosed. It is noted that each of these example methods transforms electronic data that represents a physical and tangible object. In particular, each of these example methods transforms an electronic data representation of a list of candidate red-eye objects in a photographic image that represents a real-world visual scene, such as a photograph of one or more people, for example. During these example methods, the data is transformed from a first state into a second state. In the first state, the data represents a list of candidate red-eye objects in the real-world visual scene. In the second state, the data represents a list of true red-eye objects in the real-world visual scene with false red-eye objects removed from the list.

III. First Example Method for Classifying a Candidate Red-Eye Object

Figure 3:
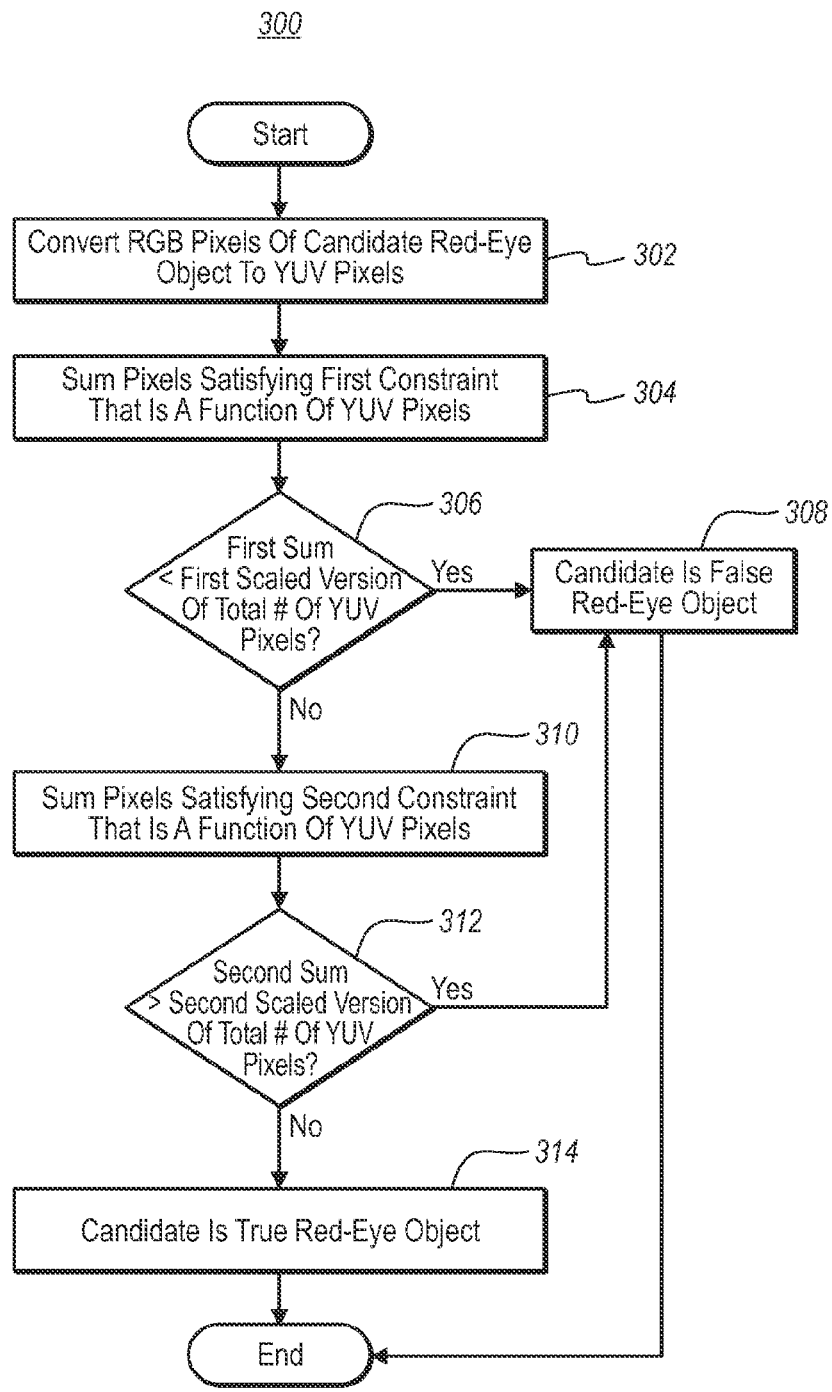
FIG. 3 is a flowchart of a first example red-eye object classification method.

With reference now to FIG. 3, a first example method 300 for classifying a candidate red-eye object in a digital photographic image is disclosed. The example method 300 employs luminance and chrominance characteristics of a candidate red-eye object to classify the object. The various acts of the method 300 will now be discussed in turn.

First, at 302, RGB pixels of the candidate red-eye object are converted into YUV pixels. For example, the act 302 can be accomplished using an RGB to YUV conversion defined as follows:

$$\begin{bmatrix} x'_{(r,s)1} \\ x'_{(r,s)2} \\ x'_{(r,s)3} \end{bmatrix} = \begin{bmatrix} 0.299 & 0.587 & 0.114 \\ -0.14173 & -0.28886 & 0.436 \\ 0.615 & -0.51499 & 0.10001 \end{bmatrix} \begin{bmatrix} x_{(r,s)1} \\ x_{(r,s)2} \\ x_{(r,s)3} \end{bmatrix} \quad (1)$$

Equation (1) decomposes each RGB pixel $x_{(r,s)}=[x_{(r,s)1}, x_{(r,s)2}, x_{(r,s)3}]$ into one luminance component $x'_{(r,s)1}$ and two chrominance components $x'_{(r,s)2}$ and $x'_{(r,s)3}$. In the resulting vector $x'_{(r,s)}=[x'_{(r,s)1}, x'_{(r,s)2}, x'_{(r,s)3}]$, which is a YUV version of the original RGB pixel $x_{(r,s)}=[x_{(r,s)1}, x_{(r,s)2}, x_{(r,s)3}]$, the component $x'_{(r,s)1}$ determines brightness of the color (referred to as luminance), while the components $x'_{(r,s)2}$ and $x'_{(r,s)3}$ determine the color itself (referred to as chrominance).

Next, at 304, the number of pixels satisfying a first constraint that is a function of the YUV pixels is summed. Then, at 306, the first sum is compared to a first scaled version of the total number of pixels in the candidate red-eye object. If the first sum is less than the first scaled version of the total number of pixels in the candidate red-eye object, then, at 308, the candidate red-eye object is classified as a false red-eye object. Alternatively, if the first sum is greater than or equal to the first scaled version of the total number of pixels in the candidate red-eye object, then, at 310, the number of pixels satisfying a second constraint that is a function of the YUV pixels is summed. Then, at 312, the second sum is compared to a second scaled version of the total number of pixels in the candidate red-eye object. If the second sum is greater than the second scaled version of the total number of pixels in the candidate red-eye object, then, at 308, the candidate red-eye object is classified as a false red-eye object. Alternatively, if the second sum is less than or equal to the second scaled version of the total number of pixels in the candidate red-eye object, then, at 314, the candidate red-eye object is classified as a true red-eye object.

The acts 304, 306, 308, 310, 312, and 314 can be performed as follows. To precisely distinguish red-eye effects from other eye's parts, background colors, and skin tones, contributions of blue and green to the chrominance components should be reduced. One possible way to accomplish this reduction is to subtract $x'_{(r,s)2}$ from $x'_{(r,s)3}$. Since the value of $x'_{(r,s)3}-x'_{(r,s)2}$ becomes high in areas which appear to be red, this value is comparable with the luminance component $x'_{(r,s)1}$. This comparison can be formally written as $x'_{(r,s)3}-x'_{(r,s)2}>\delta x'_{(r,s)1}$ where $\delta$ is a tunable parameter. Since most red-eye effects are typically characterized by low values of the green and blue components, another solution may be achieved by comparing $x'_{(r,s)3}-x'_{(r,s)2}$ with the minimum of $x_{(r,s)2}$ and $x_{(r,s)3}$, which forms $x'_{(r,s)3}-x'_{(r,s)2}>\delta' \min(x_{(r,s)2}, x_{(r,s)3})$. Similar to the previous solution, $\delta'$ is a tunable parameter. Evaluation of all pixels of the object $O_i$ using either or both of the above solutions can be used to form the following classification rule:

$$O_i = \begin{cases} \{d^i_{(r,s)}=0; (r,s) \in \Phi_i\} & \text{if } \sum_{(r,s)\in\Phi_i} (x'_{(r,s)3} - x'_{(r,s)2} > \delta x'_{(r,s)1}) < A|\Phi_i| \\ & \text{or } \sum_{(r,s)\in\Phi_i} \left( \begin{array}{c} x'_{(r,s)3} - x'_{(r,s)2} > \\ \delta' \min(x_{(r,s)2}, x_{(r,s)3}) \end{array} \right) > A'|\Phi_i| \\ O_i & \text{otherwise} \end{cases} \quad (2)$$

where $\{d_{(r,s)}^i=0;(r,s)\in \Phi_i\}$ denotes a false red-eye object being removed from the label map, $|\Phi_i|$ denotes the total number of pixels of $O_i$, while A and A' are tunable parameters. The purpose of the first criterion in Equation (2) is to identify candidate red-eye objects with a low percentage of pixels which exhibit significant redness while having low luminance. The rationale behind this criterion is that red-eyes should have a quite high number of pixels with the above characteristics. The second criterion is used to identify candidate red-eye objects with a very high percentage of pixels which have significant contributions of red and low contributions of green or blue. This concept is quite useful for detection pipelines which perform morphological dilation on the map d prior to the labeling operation. The rationale behind this concept is that dilated red-eye object areas should spawn over non-red eye portions, meaning that true red-eye objects should not have all their pixels red, as opposed to skin or some background objects. Using tunable parameters, the classifier in Equation (2) achieves processing flexibility. In some example embodiments, Equation (2) can be performed by setting the tunable parameters to $\delta=0.2$, $\delta'=0.6$, $A=0.05$, and $A'=0.9$.

IV. Second Example Method for Classifying a Candidate Red-Eye Object

Figure 4:
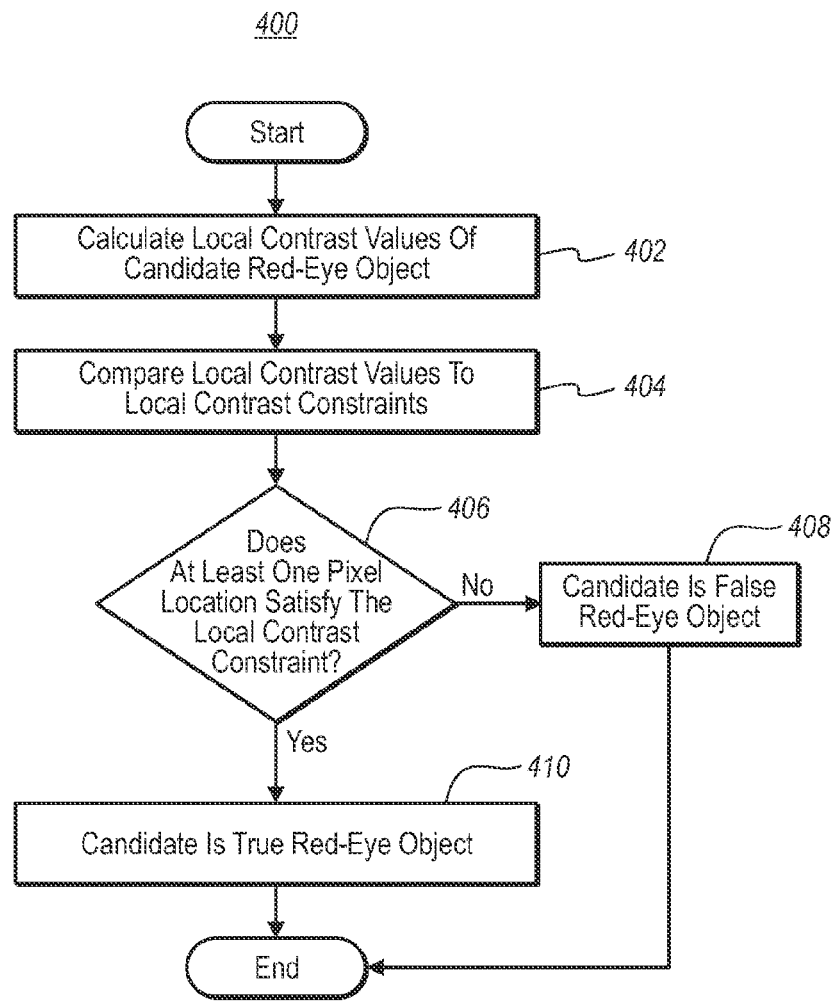
FIG. 4 is a flowchart of a second example red-eye object classification method.

With reference now to FIG. 4, a second example method 400 for classifying a candidate red-eye object in a digital photographic image is disclosed. The example method 400 employs contrast characteristics of a candidate red-eye object to classify the object. Red-eyes are usually characterized by high contrast values of pixels on the boundary of defective red areas. Thus, the contrast characteristics of candidate red-eye objects can be used to reduce false detection. The various acts of the method 400 will now be discussed in turn.

First, at act 402, local contrast values from a grayscale version of the original color pixels are calculated by using a 3×3 window $\zeta=\{(r+i,s+j); -1\leq i \leq 1, -1 \leq j \leq 1\}$ moved over an image lattice. Such grayscale values can be obtained as $x'_{(\cdot,\cdot)1}$ in Equation (1) and can be used to calculate a 3×3 matrix of contrast values as $x'_{(p,q)1}-x'_{(r,s)1}$, for $(p,q)\in \zeta$.

Next, at 404, the local contrast value of each pixel is compared to the local contrast constraint $\Sigma(x'_{(p,q)1}-x'_{(r,s)1}\kappa)\geq C$. Tunable parameters $\kappa$ and C denote, respectively, the local contrast threshold and the minimum number of $x'_{(\cdot,\cdot)1}$ values in $\zeta$ which are readily distinguishable from $x'_{(r,s)1}$ located in the center of $\zeta$. Next, at 406, it is determined whether any of the pixel locations $(r,s)\in \Phi_i$ satisfy the local contrast constraint $\Sigma(x'_{(p,q)1}-x'_{(r,s)1}>\kappa)\geq C$. If none of the pixel locations $(r,s)\in \Phi_i$ satisfy the local contrast constraint $\Sigma(x'_{(p,q)1}-x'_{(r,s)1}>\kappa)\geq C$, then, at 408, the candidate red-eye object is classified as a false red-eye object. Alternatively, if one or more of the pixel locations (r,s)∈ $\Phi_i$ satisfy the local contrast constraint $\Sigma(x'_{(p,q)1} - x'_{(r,s)1} > \kappa) \geq C$, then, at 410, the candidate red-eye object is classified as a true red-eye object.

The acts 402, 404, 406, and 408 can be performed according to the following classification rule:

$$O_i = \begin{cases} O_i & \text{if } \sum_{(p,q) \in \zeta} (x'_{(p,q)1} - x'_{(r,s)1} > \kappa) \geq C \text{ for } d_{(r,s)} = 1 \text{ with } (r, s) \in \Phi_i \\ \{d^i_{(r,s)} = 0; (r, s) \in \Phi_i\} & \text{otherwise} \end{cases} \quad (3)$$

This classifier removes candidate red-eye objects which consist of pixels with insufficient local contrast. In some example embodiments, Equation (3) can be performed by setting κ=40 and C=1.

V. Third Example Method for Classifying a Candidate Red-Eye Object

Figure 5:
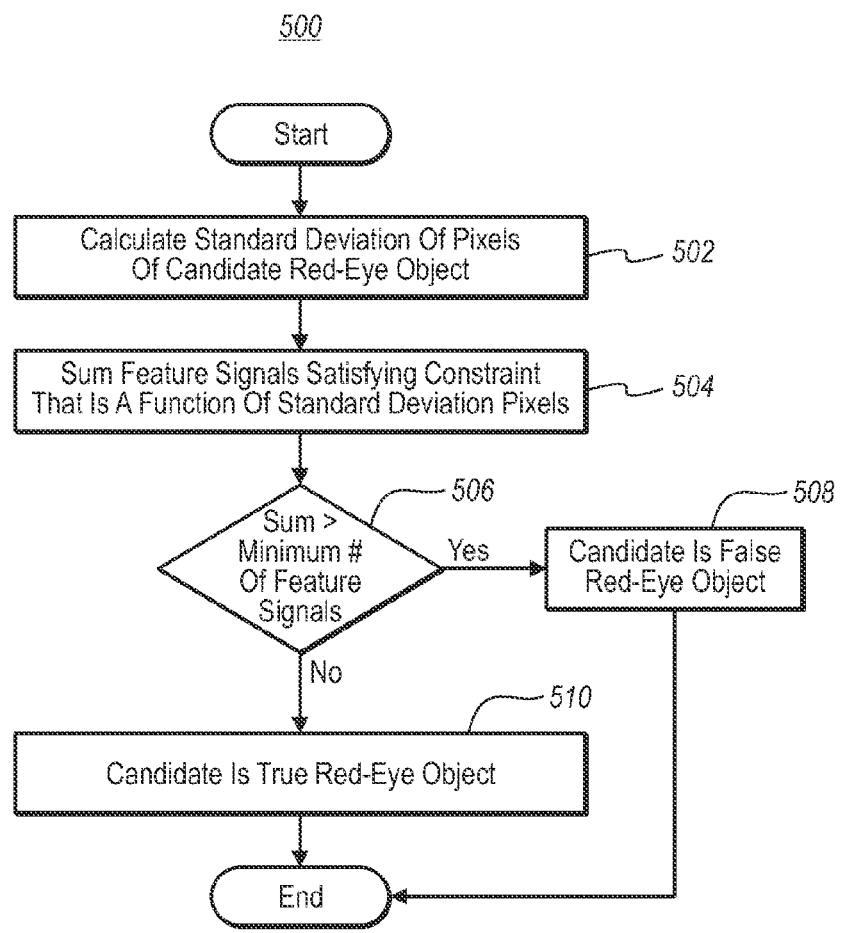
FIG. 5 is a flowchart of a third example red-eye object classification method.

With reference now to FIG. 5, a third example method 500 for classifying a candidate red-eye object in a digital photographic image is disclosed. The example method 500 employs smoothness characteristics of a candidate red-eye object to classify the object. It is quite common that a number of candidate red-eye objects coming out at early stages of the red-eye detection pipeline are background or human skin objects which exhibit similar color characteristics as true red-eye objects. However, most of those falsely detected objects are fairly smooth unlike eyes which typically have rich high-frequency contents. Smoothness of candidate objects is thus another feature applicable to red-eye candidate classification. The various acts of the method 500 will now be discussed in turn.

First, at act 502, a standard deviation value of the pixels of a candidate red-eye object is calculated for a particular feature signal. For example, operating on color data $x_{(\cdot,\cdot)\ of\ O_i}$, the standard deviation values are obtainable in a component-wise manner as follows:

$$\sigma^i_k = \sqrt{\frac{1}{|\Phi_i|} \sum_{(r,s) \in \Phi_i} (x_{(r,s)k} - \mu^i_k)} , \text{ where} \quad (4)$$

$$\mu^i_k = \frac{1}{|\Phi_i|} \sum_{(r,s) \in \Phi_i} x_{(r,s)k}$$

Next, at 504, feature signals satisfying a constraint that is a function of the standard deviation are summed. Then, at 506, the sum is compared to a minimum number of feature signals for which an object should exhibit certain smoothness in order to be considered a false red-eye object. If the sum is greater than the minimum number of signals, then, at 508, the candidate red-eye object is classified as a false red-eye object. Alternatively, if the sum is less than or equal to the minimum number of signals, then, at 510, the candidate red-eye object is classified as a true red-eye object.

The acts 504, 506, 508, and 510 can be performed according to the following classification rule:

$$O_i = \begin{cases} \{d^i_{(r,s)} = 0; (r, s) \in \Phi_i\} & \text{if } \left(\sum_k (\sigma^i_k < T^\sigma_1)\right) > T^\sigma_2 \\ O_i & \text{otherwise} \end{cases} \quad (5)$$

where $T_1^\sigma$ and $T_2^\sigma$ are tunable parameters denoting respectively the maximum standard deviation value for which $O_i$ is considered as a smooth region and the minimum number of signals for which the standard deviation constraint should be satisfied in order to consider $O_i$ as a false red-eye object.

Since color edges may not be present in all color channels, the amount of smoothness evaluated in each color channel separately can increase the processing accuracy. Improved performance characteristics of Equation (5) can be obtained by using a number of feature signals. For example, in addition to the red, green and blue components $x_{(r,s)1}$, $x_{(r,s)2}$, and $x_{(r,s)3}$, other suitable feature signals may include, but they are not limited to, the luminance $x_{(r,s)4} = x'_{(r,s)1}$, the red-green color difference $x_{(r,s)5} = x_{(r,s)1} - x_{(r,s)2}$ and the red-blue color difference $x_{(r,s)6} = x_{(r,s)1} - x_{(r,s)3}$. In some example embodiments, Equation (5) can be performed by setting k=6, $T_1^\sigma = 10$, and $T_2^\sigma = 2$.

VI. Fourth Example Method for Classifying a Candidate Red-Eye Object

Figure 6:
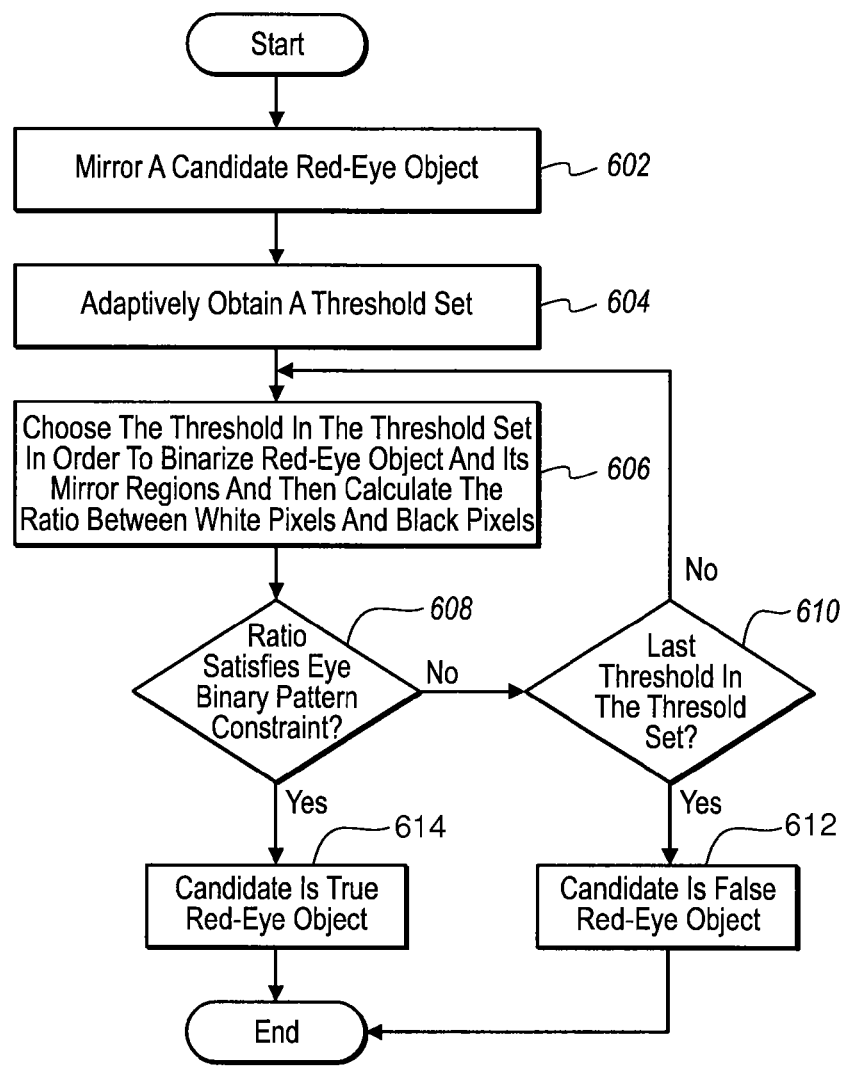
FIG. 6 is a flowchart of a fourth example red-eye object classification method.

With reference now to FIG. 6, a fourth example method 600 for classifying a candidate red-eye object in a digital photographic image is disclosed. Since images are highly nonstationary due to the presence of edges and details, simplification of image contents can reveal some valuable information which is not apparent when inspecting the original image data which often can have a noise appearance. The level of simplification can vary depending on application constraints and user needs. The example method 600 therefore aims at simplify the original data by transforming the full-color image into its binary version. Other image simplification solutions are also applicable within the proposed framework.

First, at 602, an area of a candidate red-eye object is mirrored in order to create a set of blocks neighboring with the candidate red-eye object, where these blocks have dimensions identical with dimensions of the candidate red-eye object's area. Then, at 604, a set of binarization thresholds is adaptively obtained. Next, at 606, one of the set of thresholds is chosen to binarize the red-eye object and its mirror regions, and then the chosen threshold is used to calculate a ratio between the number of white pixels and the number of black pixels for each of the generated blocks. Next, at 608, these block ratios are compared with predetermined values in order to decide whether the eye binary pattern constraint is satisfied. If the candidate red-eye object does not satisfy the eye binary pattern constraint for the chosen threshold value, then, at 610, it is determined whether all of the thresholds in the set have been chosen. If not, the method 600 returns to acts 606 and 608 where a new threshold is chosen. If so, at 612, the candidate red-eye object is classified as a false red-eye object. Alternatively, if the candidate red-eye object does satisfy the eye binary pattern constraint for the chosen threshold value, then, at 614, the candidate red-eye object is classified as a true red-eye object.

Figure 7:
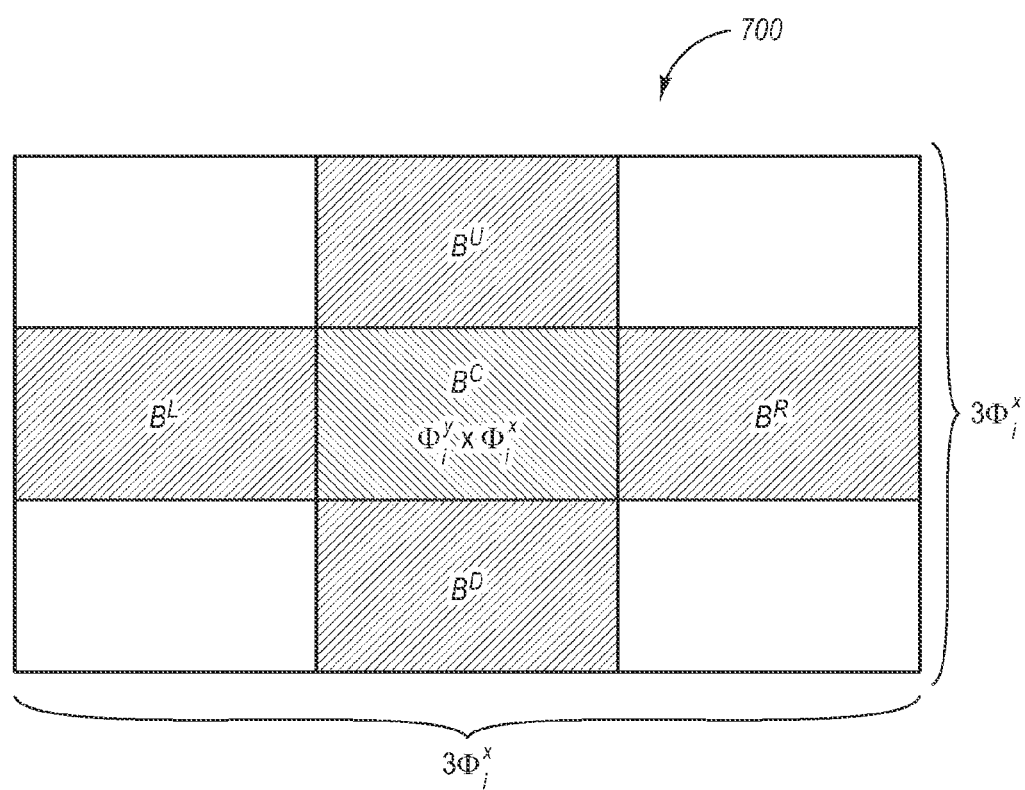
FIG. 7 is a schematic illustration of a candidate red-eye object and four neighboring blocks surrounding the candidate under consideration.

An example embodiment of the acts 602, 604, 606, 608, and 610 of the method 600 will now be disclosed. The method 600 takes a $\Phi_i^y \times \Phi_i^x$ bounding box of the object $O_i$ to adaptively calculate the threshold used to produce a binary image b with pixels $b_{(\cdot,\cdot)}$ from a $3\Phi_i^y 3\Phi_i^x$ rectangle 700 centered in the center of $\Phi_i^y \times \Phi_i^x$, as disclosed in FIG. 7. One possible way is to calculate an average $\mu^{\Phi_i}$ of grayscale versions $x'_{(\cdot,\cdot)1}$ of pixels $x'_{(\cdot,\cdot)}$ in $\Phi_i^y \times \Phi_i^x$ and use this average value to limit the range of the binarization threshold $T_b$, for example, as $T_b \in [\mu^{\Phi_i}-40, \mu^{\Phi_i}40]$. However, other operators and signals can also be employed. This threshold $T_b$ is used to determine the values of pixels in b as $b_{(\cdot,\cdot)}=1$ for $x'_{(\cdot,\cdot)1}>T_b$ and $b_{(\cdot,\cdot)}=0$ for $x'_{(\cdot,\cdot)1} \leq T_b$. The binary image b is further divided into nine non-overlapping blocks, each of size $\Phi_i^y \times \Phi_i^x$ pixels, as disclosed in FIG. 7. Since b is centered in the center of the original bounding box $\Phi_i^y \times \Phi_i^x$ of $O_i$, the statistics of eight blocks surrounding $\Phi_i^y \times \Phi_i^x$ can be compared with the statistics of the center block $B^C$ in order to determine whether $O_i$ matches a red-eye binary pattern.

To simplify calculations, only four neighboring blocks are considered in this embodiment, although other configurations are also possible. For each of $B^L$, $B^R$, $B^u$, $B^D$, and $B^C$ shown in FIG. 1, the binary block statistics is determined as follows:

$$\beta^g = \frac{\sum_{(r,s) \in B^g} b_{(r,s)}}{\Phi_i^y \Phi_i^x - \sum_{(r,s) \in B^g} b_{(r,s)}} \text{ for } g \in \{L, R, U, D, C\} \quad (6)$$

where $\beta^g$ denotes the ratio between the number of white pixels ($b_{(\cdot,\cdot)}=1$) and the number of black pixels ($b_{(\cdot,\cdot)}=0$) in the block $B^g$. Since pupil regions are much darker than surrounding regions, $B^C$ is expected to contain a fairly high percentage of black pixels (i.e., low $\beta^C$ value) while $B^L$, $B^R$, $B^U$, and $B^D$ are expected to contain a fairly high percentage of white pixels (i.e., high) $\beta^L$, $\beta^R$, $\beta^U$, $\beta^D$ values). Based on these specific eye pattern characteristics, the method 600 can be performed according to the following classification rule:

$$\begin{cases} O_i & \text{if } (\beta^C > T^C \text{ and } \beta^L < T^S \text{ and } \beta^R < T^S) \text{ or} \\ & (\beta^C > T^C \text{ and } \beta^U < T^S \text{ and } \beta^D < T^S) \\ \{d^i_{(r,s)}=0; (r,s) \in \Phi_i\} & \text{otherwise} \end{cases} \quad (7)$$

$$O_i = \begin{cases} \square & \square \\ \square & \square \\ \square & \square \end{cases}$$

where $T^C$ and $T^S$ are tunable thresholds for the central block and its neighbors, respectively. In some example embodiments, Equation (7) can be performed by setting $T^C=0.002$ and $T^S=0.3$.

It should be noted that the performance of this embodiment of the method 600 also greatly depends on the employed binarization threshold $T_b$. Since any error in location and size of $\Phi_i^y \times \Phi_i^x$ will affect the reliability of Equation (7), a number of $T_b$ values can be chosen prior to calculating the binary statistics in Equation (6) and making the decision in Equation (7) on whether $O_i$ is a true or false red-eye object. These extra calculations in the performance of the method 600 have a fairly small impact on the overall computational efficiency of the classification cascade. A candidate red-eye object is considered a true red-eye object if the classification rule in Equation (7) is satisfied for any allowed $T_b$ value.

VII. Fifth Example Method for Classifying a Candidate Red-Eye Object

Figure 8:
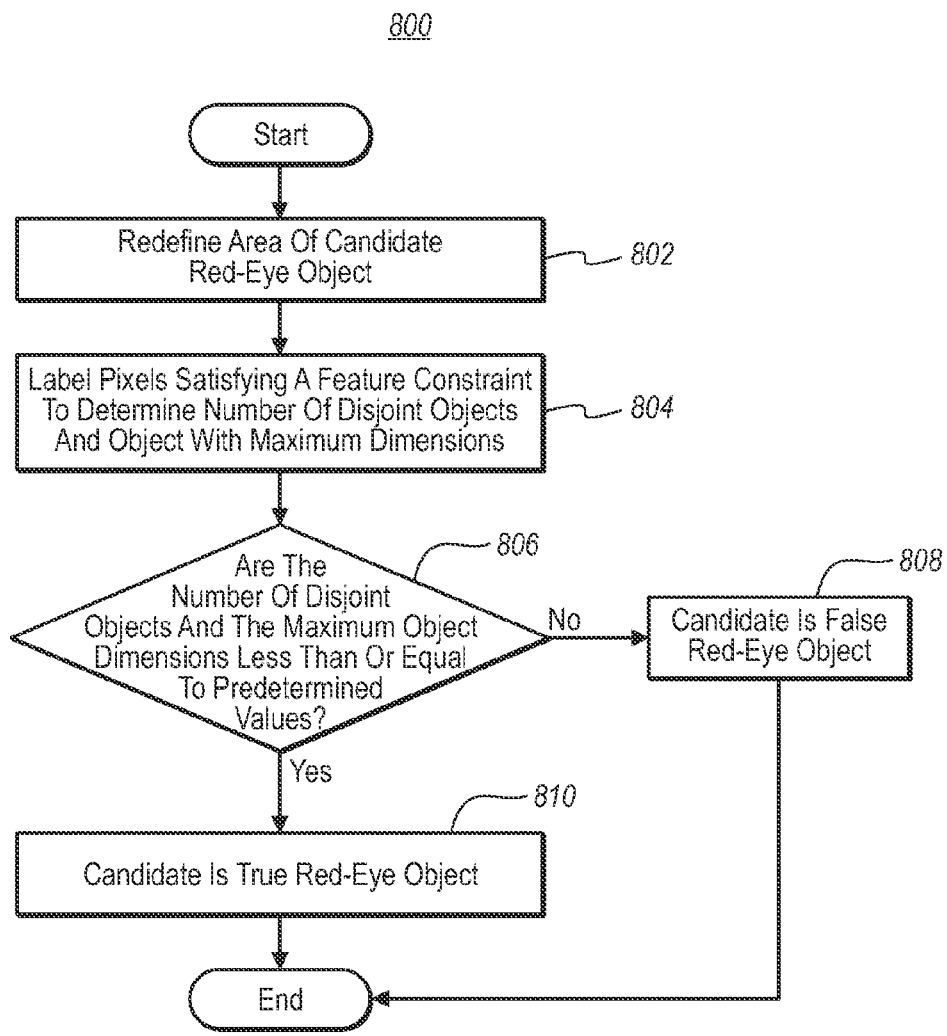
FIG. 8 is a flowchart of a fifth example red-eye object classification method.

With reference now to FIG. 8, a fifth example method 800 for classifying a candidate red-eye object in a digital photographic image is disclosed. In the design of a cascade of classifiers, it is desirable to minimize overlaps in the feature space among individual cascaded modules in order to build a system that can effectively remove false red-eye objects while preserving desired features. To complement other classification methods presented herein, the classification method 800 performs pixel-based feature extraction and object segmentation in cropped image regions of a unified size.

First, at 802, the area of the candidate red-eye object is redefined by placing the new area in the center of the candidate or in any other point within the bounding box of the candidate or its close neighborhood. Next, at 804, pixels satisfying a feature constraint are labeled in order to determine the number of disjoint objects and the object with maximum dimensions created from pixels satisfying the feature constraint. Then, at 806, the number of disjoint objects and the maximum object dimensions are compared to predetermined values. If the number of disjoint objects and the maximum object dimensions are greater than the predetermined values, then, at 808, the candidate red-eye object is classified as a false red-eye object. Alternatively, at 810, the candidate red-eye object is classified as a true red-eye object.

An example embodiment of the acts 802, 804, 806, 808, and 810 of the method 800 will now be disclosed. The method 800 employs pixel-based feature extraction and object segmentation in cropped image regions of a unified size. These cropped image regions can be centered in the center of $O_i$. However, alternative solutions can use any point in $\Phi_i^y \times \Phi_i^x$ or its close neighborhood as the center of the cropped region. The cropped region can be seen as a $\Phi^y \times \Phi^x$ rectangle of RGB pixels $x_{(r,s)}$, for $(r,s) \in \Phi'_i$ where $\Phi'_i$ is the set of all spatial locations within the rectangle. The dimensions of the cropped region can fixed for all candidate objects. In this case, $\Phi^y$ and $\Phi^x$ are constant for all $O_i$, i=1, 2, . . . , N. Alternatively, the dimensions of the cropped region can be a function of the dimensions of the original object, for example, a scaled version of original dimensions. Each pixel in $\Phi'_i$ undergoes pixel-based color feature extraction in order to produce a $\Phi^y \times \Phi^x$ binary map q with pixels $q_{(r,s)}=1$ if the desired feature has been extracted in $(r,s) \in \Phi'_i$ or $q(r,s)=0$ otherwise. For example, one possible implementation of a color feature extraction process is as follows: $q_{(r,s)}=(x'_{(r,s)x}-x'_{(r,s)2}>Qx^{i2}_{(r,s)1}/x_{(r,s)1})$ where $x'_{(r,s)}=[x'_{(r,s)1},x'_{(r,s)2},x'_{(r,s)3}]$ is a YUV version of the original RGB pixel $x_{(r,s)}=[x_{(r,s)1},x_{(r,s)2},x_{(r,s)3}]$ and Q is a tunable parameter. The map q is t in order to segment objects $O'^i_j$, for j=1, 2, . . . , N'. Of particular interest is N' denoting the number of objects in q and $O'^i_{max}$ denoting the object with the maximum width or height among $\{O'^i_j; j=1, 2, \ldots, N'\}$ which can be used to define the following classification rule:

$$\begin{cases} \square & \square \\ \square & \square \end{cases} \quad (8)$$

$$O_i = \begin{cases} \{d^i_{(r,s)} = 0; (r,s) \in \Phi_i\} \\ \text{if } N' > \varepsilon' \text{ or } (\max(\Phi^y_j, \Phi^x_j)) > T^\Phi_{max} \text{ and } R_j > R^\Phi_{max}) \\ O_i \\ \text{otherwise} \end{cases}$$

where $\Phi^y_j$ and $\Phi^x_j$ are dimensions of $O'^i_{max}$, and $R_j = \max(\Phi^y_j, \Phi^x_j)/\min(\Phi^y_j, \Phi^x_j)$ denotes the ratio between the maximum and the minimum dimension of $O'^i_{max}$. The above classifier rejects all $O_i$ objects with the corresponding binary map q having a noise-like character, that is, N' exceeding the value of the tunable parameter $\varepsilon'$. This is a property typical for complex background areas. The classifier also rejects those $O_i$ objects which exhibit line-like objects, which can be identified using the dimension constraint $T^\Phi_{max}$ and the dimension ratio $R^\Phi_{max}$. This is a property characteristic for mouth regions.

Experimentation showed that Equation (8) can produce good results for a number of configurations of its parameters. In some example embodiments, Equation (8) can be performed with $\Phi^y$ and $\Phi^x$ set to a square with the width and height equal to 19, and parameters N'=10, $T^\Phi_{max}$=0.5 max($\Phi^y, \Phi^x$), $R^\Phi_{max}$=2.5 and Q=0.75. In addition, the feature signal can include a thresholded edge and/or color detection responses.

VIII. Sixth Example Method for Classifying a Candidate Red-Eye Object

Figure 9:
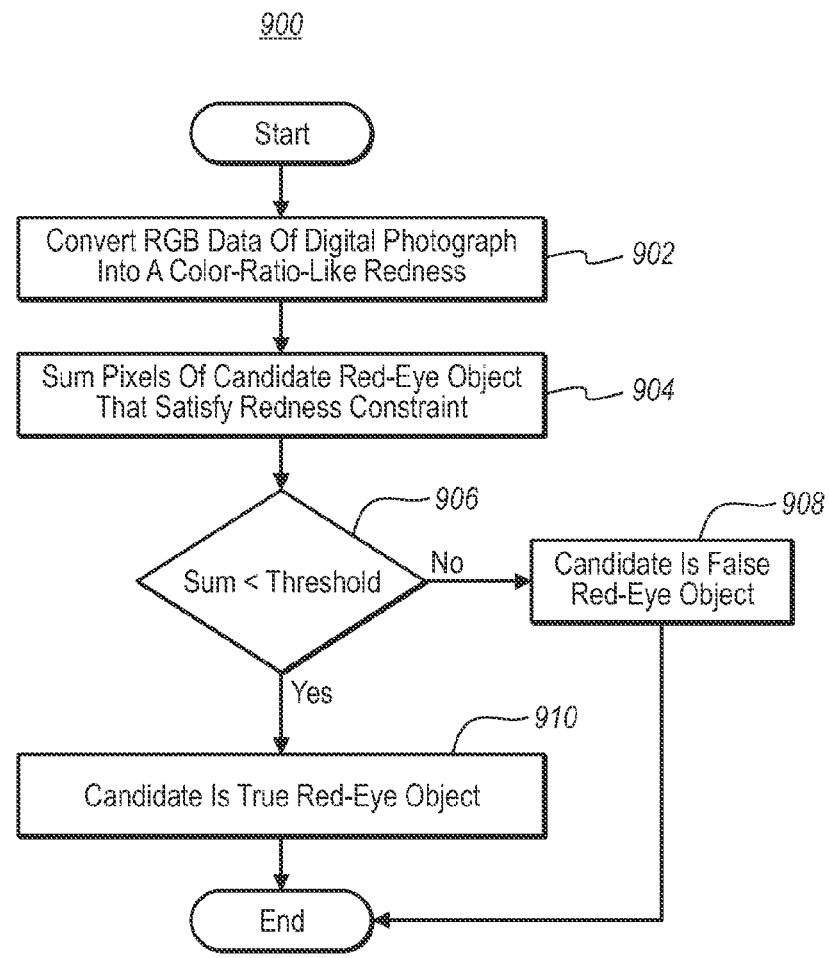
FIG. 9 is a flowchart of a sixth example red-eye object classification method.

With reference now to FIG. 9, a sixth example method 900 for classifying a candidate red-eye object in a digital photographic image is disclosed. It is not unusual that some false red-eye objects present in the face area are actually parts of a pair of eye glasses. This situation often occurs when color and/or intensity in the glasses frames area is/are similar to that of an eye. The example method 900 employs color-ratio based contrast characteristics of a candidate red-eye object to classify the candidate red-eye object.

First, at 902, RGB data of a candidate red-eye object is converted into a color-ratio-like redness. For example, the color-ratio based contrast between the red component $x_{(r,s)1}$ and the green and blue components $x_{(r,s)2}$ and $x_{(r,s)3}$ of the RGB color pixel $x_{(r,s)}$ can serve as the basis for the following image data conversion:

$$y_{(r,s)} 100 x_{(r,s)1}^2 / x_{(r,s)2}^2 + x_{(r,s)3}^3 + 1) \quad (9)$$

where $y_{(r,s)}$ is a scalar value bounded between [0,255]. Equation (9) allows for the discrimination between eye regions and glasses frame regions as eye regions, because glasses frame regions are usually characterized by a number of large $y_{(r,s)}$ values.

Next, at 904, the number of pixels of the candidate that satisfy a redness constraint are summed. Then, at 906, the sum is compared with a threshold. If the sum is greater than or equal to the threshold, then, at 908, the candidate red-eye object is classified as a false red-eye object. Alternatively, if the sum is less than the threshold, then, at 910, the candidate red-eye object is classified as a true red-eye object.

The acts 904, 906, 908, and 910 can be performed according to the following classification rule:

$$O_i = \begin{cases} \{d^i_{(r,s)} = 0; (r,s) \in \Phi_i\} & \text{if } \left( \sum_{(r,s) \in \Phi_i} (y_{(r,s)} > T^y_1) \right) < T^y_2 \\ O_i & \text{otherwise} \end{cases} \quad (10)$$

where $T^y_1$ and $T^y_2$ are, respectively, tunable parameters used to identify large $y_{(r,s)}$ values and to determine the minimum number of these large $y_{(r,s)}$ values needed for a candidate red-eye object to be considered as an eye. In some example embodiments, Equation (10) can be performed by setting $T^y_1$=150 and $T^y_2$=min(8,$T^A_{max}$/2)) where $T^A_{max}$ is the maximum value of $\Sigma_{(r,s)}(y_{(r,s)} > T^y_1)$ for objects in the close neighborhood of the candidate red-eye object $O_i$.

In order to avoid the rejection of true red-eye objects by Equation (10) in situations with no glasses frames or in complex image scenarios, the candidate objects can be searched for an object satisfying $(\Sigma_{(r,s) \in \Phi_i}(y_{(r,s)} > T^y_1)) > T^y_3$, that is, an object for which the number of large $y_{(r,s)}$ values exceeds the value of another predetermined parameter $T^y_3$. If such an object is found, then all its surrounding objects satisfying the constraint in Equation (10) can be considered to be false red-eye objects and can be removed from the list of candidate red-eye objects. In some example embodiments, Equation (10) can be performed by setting $T^y_3$=30.

The example embodiments disclosed herein may be embodied in other specific forms. The example embodiments disclosed herein are to be considered in all respects only as illustrative and not restrictive.

What is claimed is:

1. A method for classifying a candidate red-eye object in a digital image, the method comprising the acts of:
    i) selecting a candidate red-eye object in a digital image;
    ii) converting RGB pixels of the candidate red-eye object into YUV pixels;
    iii.a) summing the YUV pixels satisfying a first constraint that is a function of the YUV pixels, and iii.b) summing the number of pixels satisfying a second constraint:

$$x'_{(r,s)3} - x'_{(r,s)2} > \delta' \min(x_{(r,s)2}, x_{(r,s)3})$$

where:
    x is the digital image with RGB pixels $x_{(r,s)} = [x_{(r,s)1}, x_{(r,s)2}, x_{(r,s)3}]$;
    x' is a YUV version of x with YUV pixels $x'_{(r,s)} = [x'_{(r,s)1}, x'_{(r,s)2}, x'_{(r,s)3}]$;
    (r,s) are pixel locations; and
    $\delta'$ is a tunable parameter;
    iv) determining that the sum of iii.a) is greater than or equal to a first scaled version of the total number of YUV pixels in the candidate red-eye object, and determining that the sum of iii.b) is less than or equal to a second scaled version of the total number of YUV pixels in the candidate red-eye object; and
    v) transforming the candidate red-eye object into a true red-eye object.

2. The method as recited in claim 1, wherein the first constraint is:

$$x'_{(r,s)3} - x'_{(r,s)2} > \delta x'_{(r,s)1}$$

where:
$\delta$ is a tunable parameter.

3. The method as recited in claim 2, wherein the acts iii.a), iii.b), iv), and v) are accomplished according to the following equation:

$$O_i = \begin{cases} \{d^i_{(r,s)} = 0; (r,s) \in \Phi_i\} & \text{if } \sum_{(r,s) \in \Phi_i} (x'_{(r,s)3} - x'_{(r,s)2} > \delta x'_{(r,s)1}) < A|\Phi_i| \\ & \text{or } \sum_{(r,s) \in \Phi_i} (x'_{(r,s)3} - x'_{(r,s)2} > \delta' \min(x_{(r,s)2}, x_{(r,s)3})) > A'|\Phi_i| \\ O_i & \text{otherwise} \end{cases}$$

where:
$O_i$ is the candidate red-eye object;

$\{d_{(r,s)}^i = 0; (r,s) \in \Phi_i\}$ denotes transforming the candidate red-eye object into a false red-eye object;

$|\Phi_i|$ denotes the total number of pixels of $O_i$;

$i$ is a positive whole number; and

A and A' are tunable parameters.

4. One or more computer-readable non-transitory media storing computer-readable instructions thereon which, when executed by a processor, implement a method for classifying a candidate red-eye object in a digital image, the method comprising the acts of:

i) selecting a candidate red-eye object in a digital image;

ii) converting RGB pixels of the candidate red-eye object into YUV pixels;

iii.a) summing the YUV pixels satisfying a first constraint that is a function of the YUV pixels, and iii.b) summing the number of pixels satisfying a second constraint:

$$x'_{(r,s)3} - x'_{(r,s)2} > \delta' \min(x_{(r,s)2}, x_{(r,s)3})$$

where:

x is the digital image with RGB pixels $x_{(r,s)} = [x_{(r,s)1}, x_{(r,s)2}, x_{(r,s)3}]$;

x' is a YUV version of X with YUV pixels $x'_{(r,s)} = [x'_{(r,s)1}, x'_{(r,s)2}, x'_{(r,s)3}]$;

(r,s) are pixel locations; and $\delta'$ is a tunable parameter;

iv) determining that the sum of iii.a) is greater than or equal to a first scaled version of the total number of YUV pixels in the candidate red-eye object, and determining that the sum of iii.b) is less than or equal to a second scaled version of the total number of YUV pixels in the candidate red-eye object; and v) transforming the candidate red-eye object into a true red-eye object.

5. An image processing apparatus comprising:
an electronic display; and
a processor in electronic communication with the electronic display; and
the one or more computer-readable media as recited in claim 4.

6. The image processing apparatus as recited in claim 5, wherein:
the image processing apparatus further comprises a printer;
the one or more computer-readable media comprises one or more of a RAM, a ROM, and a flash EEPROM; and
the electronic display comprises a liquid crystal display.

* * * * *